United States Patent
Wang et al.

(10) Patent No.: US 10,044,407 B2
(45) Date of Patent: Aug. 7, 2018

(54) LINE INITIALIZATION METHOD, DEVICE, AND SYSTEM

(71) Applicant: Huawei Technologies Co., Ltd., Shenzhen, Guangdong (CN)

(72) Inventors: Xiang Wang, Shenzhen (CN); Yixian Liu, Shenzhen (CN); Jianhua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 397 days.

(21) Appl. No.: 14/973,965

(22) Filed: Dec. 18, 2015

(65) Prior Publication Data

US 2016/0105216 A1    Apr. 14, 2016

Related U.S. Application Data

(63) Continuation of application No. PCT/CN2013/077567, filed on Jun. 20, 2013.

(51) Int. Cl.
| | |
|---|---|
| *H04M 9/08* | (2006.01) |
| *H04B 3/32* | (2006.01) |
| *H04M 11/06* | (2006.01) |

(52) U.S. Cl.
CPC ............ *H04B 3/32* (2013.01); *H04M 11/062* (2013.01)

(58) Field of Classification Search
CPC ................................ H04B 3/32; H04M 11/062
See application file for complete search history.

(56) References Cited

U.S. PATENT DOCUMENTS

| | | |
|---|---|---|
| 6,967,997 B2 | 11/2005 | Humphrey |
| 7,035,326 B1 | 4/2006 | Heidari et al. |
| 2009/0073867 A1* | 3/2009 | Schenk ............... H04L 5/0007 370/201 |

FOREIGN PATENT DOCUMENTS

| | | |
|---|---|---|
| CN | 101119134 A | 2/2008 |
| CN | 101197797 B | 12/2011 |
| EP | 2 464 026 A1 | 6/2012 |
| EP | 2 466 757 A1 | 6/2012 |
| JP | 2005286480 A | 10/2005 |

* cited by examiner

*Primary Examiner* — Simon King

(57) ABSTRACT

Embodiments of the present invention provide a line initialization method, a device, and a system. The method includes: when a new line is added, releasing at least one resource unit that is on a line at a Showtime stage, so that on the line at the Showtime stage data is transmitted on a remaining resource unit that is obtained after the at least one resource unit is released; performing basic initialization on the new line by using the at least one resource unit or a subset of the at least one resource unit, so that after the basic initialization, data can be transmitted on the new line by using the at least one resource unit or the subset of the at least one resource unit; and performing crosstalk cancellation initialization on the line at the Showtime stage and the new line by using all resource units.

16 Claims, 9 Drawing Sheets

LINE INITIALIZATION METHOD, DEVICE, AND SYSTEM

CROSS-REFERENCE TO RELATED APPLICATIONS

This application is a continuation of International Application No. PCT/CN2013/077567, filed on Jun. 20, 2013, which is hereby incorporated by reference in its entirety.

TECHNICAL FIELD

The present invention relates to communications technologies, and in particular, to a line initialization method, a device, and a system.

BACKGROUND xDSL is a generic term for various DSLs (digital subscriber line), and includes an ADSL (asymmetric digital subscriber line), an RADSL (rate adaptive digital subscriber line), a VDSL (V very high speed digital subscriber line), an SDSL (symmetric digital subscriber line), an IDSL (integrated services digital network-based digital subscriber line), an SHDSL (single-pair high-speed digital subscriber line), and the like. The xDSL is a high-speed data transmission technology for transmission on a phone twisted-pair cable. Apart from DSLs such as the IDSL and the SHDSL for baseband transmission, an xDSL for passband transmission enables, by using a frequency division multiplexing technology, the xDSL and a POTS (Plain Old Telephone Service, plain old telephone service) to coexist on a same pair of twisted-pair cables, where the xDSL occupies a high frequency band, the POTS occupies a baseband below 4 kHz, and a POTS signal is separated from an xDSL signal by using a splitter. A system providing access to multiple xDSLs is referred to as a DSL access multiplexer (Digital Subscriber Line Access Multiplexer, DSLAM for short). Due to a principle of electromagnetic induction, multiple channels of signals that are led to the DSLAM interfere with each other, where the interference is referred to as crosstalk (Crosstalk), as shown in FIG. 1 and FIG. 2. FIG. 1 shows a case of near-end crosstalk (NEXT), and FIG. 2 shows a case of far-end crosstalk (FEXT). Energy of both the near-end crosstalk (NEXT) and the far-end crosstalk (FEXT) enhances as a frequency band increases. xDSL uplink and downlink channels use the frequency division multiplexing, and therefore, system performance is not much damaged by the near-end crosstalk (NEXT). However, because a frequency band used for the xDSL becomes increasingly wide, the far-end crosstalk (FEXT) causes increasingly severe impact on transmission performance of a line.

To resolve the foregoing problem, at present, a Vectoring (crosstalk cancellation) technology is proposed in the industry, to cancel FEXT interference by using a signal processing method mainly according to a probability of joint receiving and sending at a DSLAM end, thereby finally cancelling FEXT interference in each channel of signal. FIG. 3 is a schematic principle diagram of synchronous sending and synchronous receiving at a DSLAM end. In an uplink direction, at the DSLAM end, FEXT information is extracted, by using an uplink crosstalk canceller, from a received signal that is sent by a client device, and is then removed from the received signal, to eliminate impact of FEXT, thereby implementing DSL performance in an ideal environment that is almost free from crosstalk. Likewise, in a downlink direction, the client device feeds back the FEXT information to the DSLAM end by means of agreement between an office terminal at the DSLAM end and a far-end terminal, and then, the DSLAM end precodes, by using a downlink vector pre-coder, these pieces of FEXT information into a normal signal to be sent. In this way, the precoded signal and FEXT cancel each other out during transmission, and the client device can receive correct information that is almost free from crosstalk.

In the prior art, when a new line is added in a system, a DSLAM end needs to initialize the new line, and in the initialization process, basic initialization and crosstalk cancellation initialization are alternately performed on the new line, that is, the DSLAM end performs basic initialization on the new line during a process in which an uplink crosstalk canceller and a downlink vector pre-coder of the system are updated again, so that the new line enters a data transmission stage (Showtime stage), and FEXT between the new line and an existing line at the Showtime stage is cancelled. Generally, both a central office device and a client device send pilot sequences on synchronization symbols (Sync Symbols), and a receive end feeds back an error to a VCE (Vectoring Control Entity, vectoring control entity) to calculate an uplink crosstalk canceller and a downlink vector pre-coder. If there are N lines in the system, N Sync Symbols are needed to completely estimate crosstalk between the N lines, thereby calculating the uplink crosstalk canceller and the downlink vector pre-coder for Vectoring. For the Walsh-Hadamard orthogonal pilot with an order of 2 raised to the $n^{th}$ power that is commonly used the industry at present, at least $2^{\lceil \log_2 N \rceil}$ Sync Symbols are needed. Generally, an interval between Sync Symbols in an xDSL is relatively large; for example, for VDSL2, two consecutive Sync Symbols are spaced by 256 symbols, about 64 ms. Therefore, when there are many lines, it needs to take a very long time to completely estimate an uplink crosstalk canceller and a downlink vector pre-coder for Vectoring for once. Especially during initialization, according to some adjustments in processing of a signal at an analog end or a digital end, multiple times of estimation are needed, which further prolongs a time for the initialization. In addition, it also takes a relatively long time for the new line to have a data transmission capability, which causes that a client device connected to the new line needs to wait a relatively long time to transmit data.

SUMMARY

The present invention provides a line initialization method, a device, and a system, which are used to shorten a time for initializing a new line.

A first aspect of the present invention provides a line initialization method, including:

when a new line is added, releasing at least one resource unit that is on a line at a Showtime stage, where on the line at the Showtime stage data is transmitted on a remaining resource unit that is obtained after the at least one resource unit is released;

performing basic initialization on the new line by using the at least one resource unit or a subset of the at least one resource unit, to transmit data on the new line after the basic initialization by using the at least one resource unit or the subset of the at least one resource unit; and performing crosstalk cancellation initialization on the line at the Showtime stage and the new line by using all resource units, to enable the new line to be initialized to a line at the Showtime stage, where all the resource units include the at least one resource unit and the remaining resource unit.

With reference to the first aspect of the line initialization method, in a first possible implementation manner, the resource unit is a subcarrier or a timeslot.

With reference to the first aspect or the first possible implementation manner of the line initialization method, in a second possible implementation manner, the performing crosstalk cancellation initialization on the line at the Showtime stage and the new line by using all resource units includes:

sending a first test signal to a client device by using all the resource units that are on the new line and the line at the Showtime stage, so that the client device calculates and feeds back first error information according to the first test signal;

correcting an adjustable parameter in a downlink pre-coder according to the first error information;

receiving a second test signal that is sent by the client device by using all the resource units that are on the new line and the line at the Showtime stage;

calculating second error information according to the second test signal; and correcting an adjustable parameter in an uplink crosstalk canceller according to the second error information, where the uplink crosstalk canceller and the downlink pre-coder are configured to cancel crosstalk interference between the new line and the line at the Showtime stage.

With reference to the second possible implementation manner of the line initialization method, in a third possible implementation manner, the test signal is a pilot sequence or a sounding signal.

With reference to the first aspect or any one of the first to third possible implementation manners of the line initialization method, in a fourth possible implementation manner, after the performing crosstalk cancellation initialization on the line at the Showtime stage and the new line by using all resource units, the method further includes:

calculating a physical layer parameter existing when a remaining resource unit in all the resource units except the at least one resource unit or the subset of the at least one resource unit is used on the new line, so that data is transmitted on the new line by using the remaining resource unit according to the physical layer parameter.

With reference to the first aspect or any one of the first to third possible implementation manners of the line initialization method, in a fifth possible implementation manner, after the performing crosstalk cancellation initialization on the line at the Showtime stage and the new line by using all resource units, the method further includes:

if the resource unit is a timeslot, instructing to transmit data on the new line directly by using all the resource units.

With reference to the first aspect or any one of the first to fifth possible implementation manners of the line initialization method, in a sixth possible implementation manner, after the performing crosstalk cancellation initialization on the line at the Showtime stage and the new line by using all resource units, the method further includes:

restoring the line at the Showtime stage to a transmission status existing before the new line is added; or acquiring, according to a preset correspondence between a resource unit set and a physical layer parameter, a physical layer parameter corresponding to the set of the at least one resource unit used on the line at the Showtime stage, so that on the line at the Showtime stage data is transmitted by using the at least one resource unit according to the physical layer parameter; or calculating a physical layer parameter existing when the at least one resource unit is used on the line at the Showtime stage, so that on the line at the Showtime stage data is transmitted by using the at least one resource unit according to the physical layer parameter.

With reference to the fourth or sixth possible implementation manner of the line initialization method, in a seventh possible implementation manner, the physical layer parameter includes a bit loaded on a subcarrier and a data framing parameter.

With reference to the first aspect or any one of the first to seventh possible implementation manners of the line initialization method, in an eighth possible implementation manner, the releasing at least one resource unit that is on a line at a Showtime stage and is currently used to transmit data includes:

sending, to the client device, negotiation information that carries the at least one resource unit to be released, so that the client device releases the at least one resource unit, on the line at the Showtime stage, of the client device according to the negotiation information, and returns corresponding acknowledgement information; and releasing the at least one resource unit, on the line at the Showtime stage, of a central office device according to the acknowledgement information;

or releasing the at least one resource unit, on the line at the Showtime stage, of a central office device, and acquiring, according to a preset correspondence between indication information and a resource unit set, indication information corresponding to the set of the at least one resource unit; and sending the indication information to the client device, so that the client device acquires, according to the preset correspondence between indication information and a resource unit set, the resource unit set corresponding to the indication information, and releases the at least one resource unit, in the resource unit set and on the line at the Showtime stage, of the client device.

A second aspect of the present invention provides a central office device, including:

a releasing module, configured to: when a new line is added, release at least one resource unit that is on a line at a Showtime stage and that is currently used to transmit data, where on the line at the Showtime stage data is transmitted on a remaining resource unit that is obtained after the at least one resource unit is released;

a basic initialization module, configured to perform basic initialization on the new line by using the at least one resource unit or a subset of the at least one resource unit, to transmit data on the new line after the basic initialization by using the at least one resource unit or the subset of the at least one resource unit; and a crosstalk cancellation initialization module, configured to perform crosstalk cancellation initialization on the line at the Showtime stage and the new line by using all resource units, to enable the new line to be initialized to a line at the Showtime stage, where all the resource units include the at least one resource unit and the remaining resource unit.

With reference to the second aspect of the central office device, in a first possible implementation manner, the crosstalk cancellation initialization module includes:

a sending unit, configured to send a first test signal to a client device by using all the resource units that are on the new line and the line at the Showtime stage, so that the client device calculates and feeds back first error information according to the first test signal;

a first calculation unit, configured to correct an adjustable parameter in a downlink pre-coder according to the first error information;

a receiving unit, configured to receive a second test signal that is sent by the client device by using all the resource units that are on the new line and the line at the Showtime stage; and a second calculation unit, configured to calculate second error information according to the second test signal, and correct an adjustable parameter in an uplink crosstalk canceller according to the second error information, where the uplink crosstalk canceller and the downlink pre-coder are configured to cancel crosstalk interference between the new line and the line at the Showtime stage.

With reference to the second aspect or the first possible implementation manner of the central office device, in a second possible implementation manner, the central office device further includes:

a calculation module, configured to calculate a physical layer parameter existing when a remaining resource unit in all the resource units except the at least one resource unit or the subset of the at least one resource unit is used on the new line, so that data is transmitted on the new line by using the remaining resource unit according to the physical layer parameter.

With reference to the second aspect or the first possible implementation manner of the central office device, in a third possible implementation manner, the central office device further includes:

an instructing module, configured to: when the resource unit is a timeslot, instruct to transmit data on the new line directly by using all the resource units.

With reference to the second aspect or any one of the first to third possible implementation manners of the central office device, in a fourth possible implementation manner, the central office device further includes:

a processing module, configured to restore the line at the Showtime stage to a transmission status existing before the new line is added; or acquire, according to a preset correspondence between a resource unit set and a physical layer parameter, a physical layer parameter corresponding to the set of the at least one resource unit used on the line at the Showtime stage, so that on the line at the Showtime stage data is transmitted by using the at least one resource unit according to the physical layer parameter; or calculate a physical layer parameter existing when the at least one resource unit is used on the line at the Showtime stage, so that on the line at the Showtime stage data is transmitted by using the at least one resource unit according to the physical layer parameter.

With reference to the second aspect or any one of the first to fourth possible implementation manners of the central office device, in a fifth possible implementation manner, the releasing module further includes:

a sending unit, configured to send, to the client device, negotiation information that carries the at least one resource unit to be released, so that the client device releases the at least one resource unit, on the line at the Showtime stage, of the client device according to the negotiation information, and returns corresponding acknowledgement information; and a releasing unit, configured to release the at least one resource unit, on the line at the Showtime stage, of a central office device according to the acknowledgement information; or the releasing module includes:

a releasing unit, configured to release the at least one resource unit, on the line at the Showtime stage, of a central office device, and acquire, according to a preset correspondence between indication information and a resource unit set, indication information corresponding to the set of the at least one resource unit; and a sending unit, configured to send the indication information to the client device, so that the client device acquires, according to the preset correspondence between indication information and a resource unit set, the resource unit set corresponding to the indication information, and releases the at least one resource unit, in the resource unit set and on the line at the Showtime stage, of the client device.

A third aspect of the present invention provides a communications system, including a central office device and at least one client device, where the central office device is connected to the at least one client device by using a line.

where the central office device is configured to: when a new line is added, release at least one resource unit that is on a line at a Showtime stage and is currently used to transmit data, where on the line at the Showtime stage data is transmitted on a remaining resource unit that is obtained after the at least one resource unit is released; perform basic initialization on the new line by using the at least one resource unit or a subset of the at least one resource unit, to transmit data on the new line after the basic initialization by using the at least one resource unit or the subset of the at least one resource unit; and perform crosstalk cancellation initialization on the line at the Showtime stage and the new line by using all resource units, to enable the new line to be initialized to a line at the Showtime stage, where all the resource units include the at least one resource unit and the remaining resource unit.

A fourth aspect of the present invention provides a central office device, including: a processor, a communications interface, a memory, and a bus, where the processor, the communications interface, and the memory communicate with one another by using the bus;

the communications interface is configured to connect to a client device by using a new line and a line at a Showtime stage;

the processor is configured to execute a program; and the memory is configured to store the program, where the program is used to: when a new line is added, release at least one resource unit that is on a line at a Showtime stage and is currently used to transmit data, where on the line at the Showtime stage data is transmitted on a remaining resource unit that is obtained after the at least one resource unit is released; perform basic initialization on the new line by using the at least one resource unit or a subset of the at least one resource unit, to transmit data on the new line after the basic initialization by using the at least one resource unit or the subset of the at least one resource unit; and perform crosstalk cancellation initialization on the line at the Showtime stage and the new line by using all resource units, to enable the new line to be initialized to a line at the Showtime stage, where all the resource units include the at least one resource unit and the remaining resource unit.

It can be learned from the foregoing technical solutions that, in the embodiments of the present invention, some resource units that are on a line at a Showtime stage are released, and basic initialization is first performed on a new line by using the some resource units, so that data can be transmitted on the new line by using the some resource units, and crosstalk between the new line and the line at the Showtime stage is temporarily avoided; and then, crosstalk cancellation initialization is performed on the line at the Showtime stage and the new line by using all resource units. A large amount of data needs to be exchanged in a crosstalk cancellation initialization process. Because after the basic initialization, the new line already has a transmission capability, in this case, the new line can participate in data transmission in the crosstalk cancellation initialization process, thereby shortening a time for the crosstalk cancellation initialization. In terms of the entire initialization process, compared with the prior art, in the embodiments of the present invention, the new line can have a data transmission capability within a relatively short time, the line at the Showtime stage is not interfered by crosstalk in the entire initialization process, and the new line can be relatively rapidly used to transmit data; therefore, a time that a client device of the new line waits is obviously shortened.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely some rather than all of the embodiments of the present application. All other embodiments obtained by persons of ordinary skill in the art based on the embodiments of the present application without creative efforts shall fall within the protection scope of the present application.

Figure 1:
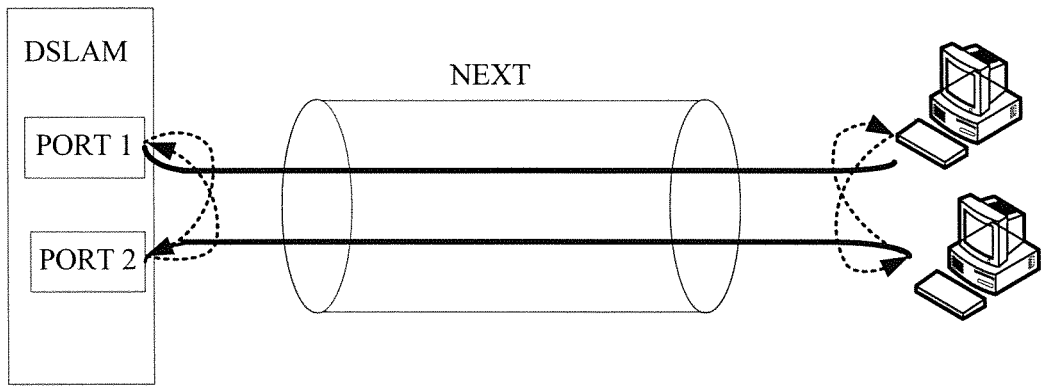
FIG. 1 is a schematic principle diagram of near-end crosstalk between lines in the prior art.
Figure 2:
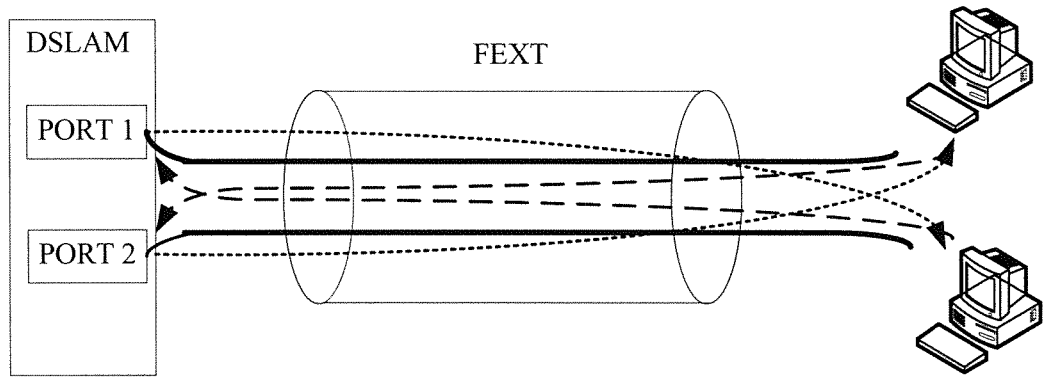
FIG. 2 is a schematic principle diagram of far-end crosstalk between lines in the prior art.
Figure 3:
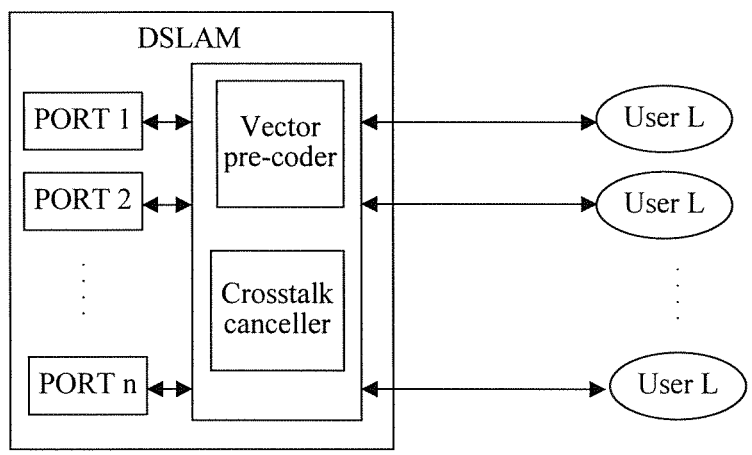
FIG. 3 is a schematic principle diagram of synchronous sending and synchronous receiving at a DSLAM end in the prior art.
Figure 4:
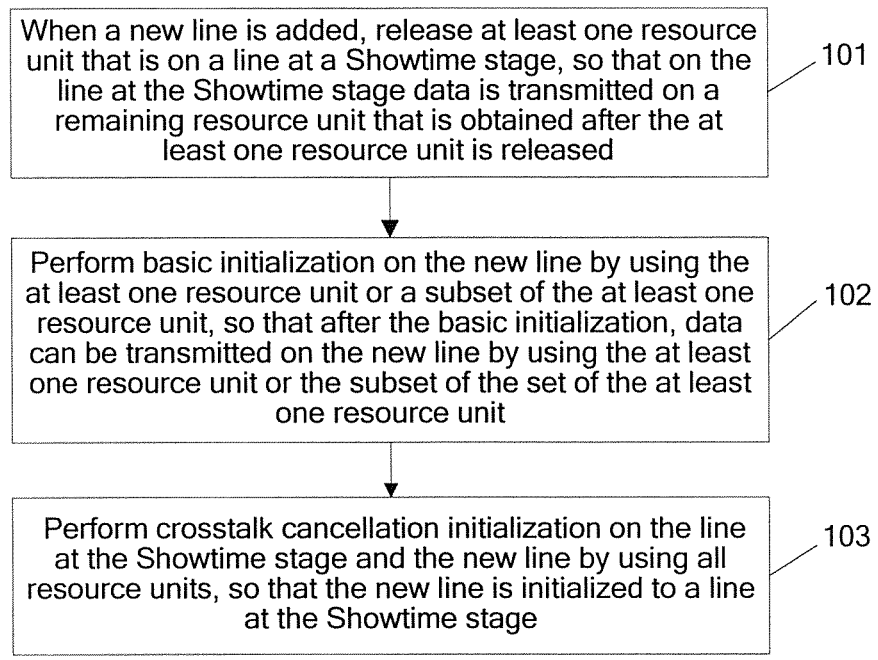
FIG. 4 is a schematic flowchart of a line initialization method according to Embodiment 1 of the present invention.

As shown in FIG. 4, FIG. 4 is a schematic flowchart of a line initialization method according to Embodiment 1 of the present invention. As shown in FIG. 4, the method described in Embodiment 1 includes:

Step 101: When a new line is added, release at least one resource unit that is on a line at a Showtime stage, so that on the line at the Showtime stage data is transmitted on a remaining resource unit that is obtained after the at least one resource unit is released.

Specifically, the resource unit may be a subcarrier or a timeslot. The resource unit may be a resource unit that is currently used on a line at a Showtime stage, or may be a resource unit that is idle and that is used on none of lines at a Showtime stage (that is, an intersection set of idle resource units of all the lines at the Showtime stage). When a new line is added, a central office device (or a DSLAM end) releases at least one subcarrier or timeslot that is on a line at a Showtime stage and that is currently used to transmit data, so that on the line at the Showtime stage data is transmitted on a remaining subcarrier or timeslot obtained after the releasing. Alternatively, the central office device directly acquires the at least one subcarrier or timeslot that is on the line at the Showtime stage and that is not currently used to transmit data. In an actual application, a case of idle timeslots is very common, that is, when the line at the Showtime stage works in an energy saving mode, on the line at the Showtime stage data is transmitted in only some timeslots. In this case, the central office device can acquire at least one timeslot that is on all lines at the Showtime stage and that is currently not used to transmit data.

The line at the Showtime stage refers to a line that is already in a transmission stage, where the transmission stage refers to a state that is achieved after an initialization process by a transceiver unit of the central office device and a transceiver unit of a client device and in which data of a bearer channel can be transmitted.

Because the line at the Showtime stage connects the central office device and the client device, when some resource units that are on the line at the Showtime stage are to be released, not only some resource units, on the line at the Showtime stage, of the central office device need to be released; the central office device also needs to instruct, in a negotiation manner or an instruction sending manner, the client device that is at the other end of the line at the Showtime stage to release the some resource units that are on the line at the Showtime stage. Therefore, in this step, releasing, by the central office device, the at least one resource unit that is on the line at the Showtime stage and that is currently used to transmit data may be implemented in the following negotiation manner:

First, the central office device sends, to the client device, negotiation information that carries the at least one resource unit to be released, so that the client device releases the at least one resource unit, on the line at the Showtime stage, of the client device according to the negotiation information, and returns corresponding acknowledgement information.

Then, the central office device releases the at least one resource unit, on the line at the Showtime stage, of the central office device according to the acknowledgement information.

Alternatively, releasing, by the central office device, the at least one resource unit that is on the line at the Showtime stage and that is currently used to transmit data may also be implemented in the following indication information sending manner:

First, the central office device releases the at least one resource unit, on the line at the Showtime stage, of the central office device, and acquires, according to a preset correspondence between indication information and a resource unit set, indication information corresponding to the set of the at least one resource unit.

Then, the central office device sends the indication information to the client device, so that the client device acquires, according to the preset correspondence between indication information and a resource unit set, the resource unit set corresponding to the indication information, and releases the at least one resource unit, in the resource unit set and on the line at the Showtime stage, of the client device.

Step 102: Perform basic initialization on the new line by using the at least one resource unit or a subset of the at least one resource unit, so that after the basic initialization, data can be transmitted on the new line by using the at least one resource unit or the subset of the set of the at least one resource unit.

Specifically, the central office device performs basic initialization on the new line by using the at least one resource unit or the subset of the set of the at least one resource unit. The basic initialization may include: a handshake stage, a transceiver training stage, a channel analysis stage, and an exchange stage. At the handshake stage, the central office device establishes a connection with the client device according to a handshake process specified in the G.994.1 standard. At the transceiver training stage, the central office device sends a standard signal to the client device that is at the other end of the new line by using the at least one resource unit or the subset of the set of the at least one resource unit used on the new line, to perform gain control; and performs synchronous training on the transceivers of the central office device and the client device, and performs equalizer training at the same time. At the channel analysis stage, the central office device determines a rate and a format for data transmission. At the exchange stage, the central office device determines a quantity of bits that should be allocated to a subcarrier that is on the at least one resource unit or in the subset of the set of the at least one resource unit. After the basic initialization, the new line has a capability of transmitting data by using the at least one resource unit or the subset of the set of the at least one resource unit.

It should be additionally noted herein that specific implementation of the basic initialization described in this embodiment of the present invention is not limited to the implementation process enumerated above, and any initialization process is applicable to this embodiment provided that the initialization process can enable the new line to have a capability of transmitting data by using the at least one resource unit or the subset of the set of the at least one resource unit.

Step 103: Perform crosstalk cancellation initialization on the line at the Showtime stage and the new line by using all resource units, so that the new line is initialized to a line at the Showtime stage.

All the resource units include the at least one resource unit and the remaining resource unit. The resource unit may be a subcarrier or a timeslot. Specifically, the performing, by the central office device, crosstalk cancellation initialization on the line at the Showtime stage and the new line by using all resource units, so that the new line is initialized to a line at the Showtime stage may be implemented by using the following method:

First, the central office device sends a first test signal to the client device by using all the resource units that are on the new line and the line at the Showtime stage, so that the client device calculates and feeds back first error information according to the first test signal.

Figure 6:
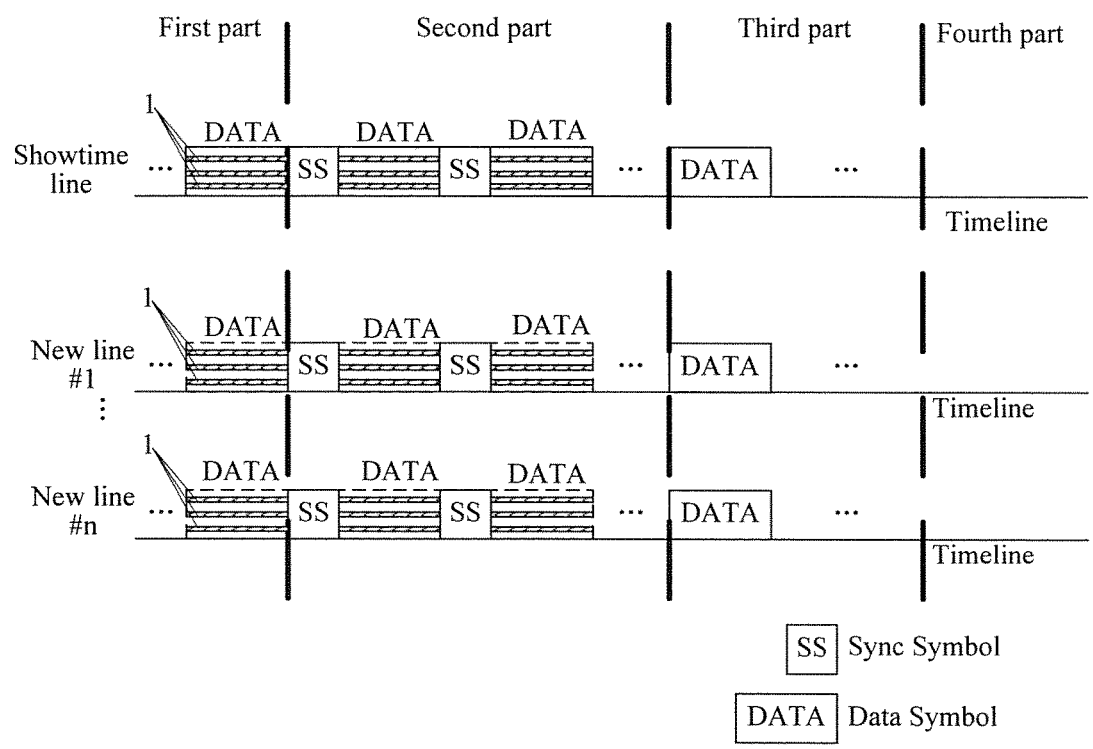
FIG. 6 is a schematic principle diagram of the line initialization method according to Embodiment 2 of the present invention.
Figure 8:
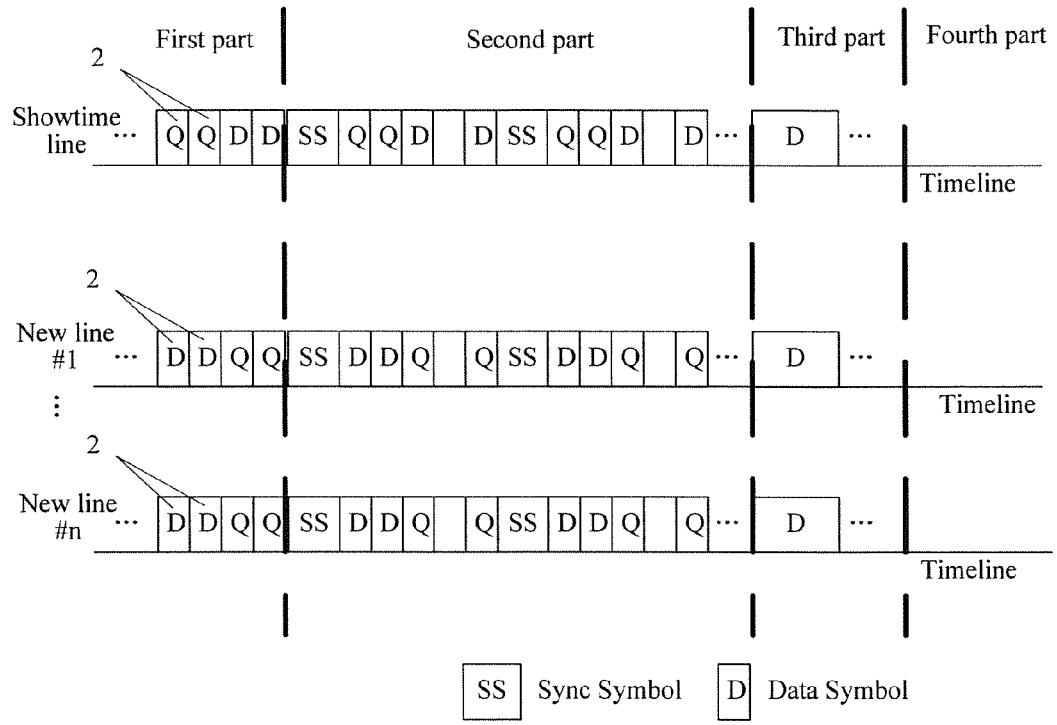
FIG. 8 is a schematic principle diagram of the line initialization method according to Embodiment 3 of the present invention.

The first test signal may be a pilot sequence, or a sounding signal on which the crosstalk cancellation initialization is performed by using another form, for example, an LMS algorithm. In a crosstalk cancellation initialization process, generally, both the central office device and the client device send pilot sequences or sounding signals on synchronization symbols (Sync Symbols). After the crosstalk cancellation initialization is complete, the central office device and the client device may send data on data symbols (Data Symbols). Specifically, as shown in FIG. 6 and FIG. 8, the central office device sends the first test signal to the client device by using all the resource units that are on the new line and the line at the Showtime stage, so that the client device calculates and feeds back the first error information according to the first test signal.

Then, the central office device corrects an adjustable parameter in a downlink pre-coder according to the first error information.

Subsequently, the central office device receives a second test signal that is sent by the client device by using all the resource units that are on the new line and the line at the Showtime stage.

The second test signal may be a pilot sequence, or a sounding signal on which crosstalk cancellation initialization is performed by using another form, for example, an LMS algorithm.

Next, the central office device calculates second error infatuation according to the second test signal.

Finally, the central office device corrects an adjustable parameter in an uplink crosstalk canceller according to the second error information.

The uplink crosstalk canceller and the downlink pre-coder are configured to cancel crosstalk interference between the new line and the line at the Showtime stage. The uplink crosstalk canceller and the downlink pre-coder are stored in the central office device in a form of software, or the uplink crosstalk canceller and the downlink pre-coder are independent control entities disposed in the central office device. The central office device corrects the adjustable parameters in the uplink crosstalk canceller and the downlink pre-coder, so that the uplink crosstalk canceller and the downlink pre-coder adapt to crosstalk cancellation in a new system that is formed after the new line is added.

It should be noted herein that, a Vectoring training method in the prior art may be used for the crosstalk cancellation initialization described in this embodiment. The crosstalk cancellation initialization is essentially to update the uplink crosstalk canceller and the downlink pre-coder of the system, so that after the new line is added, crosstalk between lines is cancelled in the system.

In this embodiment, some resource units that are used on a line at a Showtime stage are released, and basic initialization is first performed on a new line by using the some resource units, so that data can be transmitted on the new line by using the some resource units, and crosstalk between the new line and the line at the Showtime stage is temporarily avoided; and then, crosstalk cancellation initialization is performed on the line at the Showtime stage and the new line by using all resource units. A large amount of data needs to be exchanged in a crosstalk cancellation initialization process. Because after the basic initialization, the new line already has a transmission capability, in this case, the new line can participate in data transmission in the crosstalk cancellation initialization process, thereby shortening a time for the crosstalk cancellation initialization. In terms of the entire initialization process, compared with the prior art, in this embodiment of the present invention, the new line can have a data transmission capability within a relatively short time, the line at the Showtime stage is not interfered by crosstalk in the entire initialization process, and the new line can be relatively rapidly used to transmit data; therefore, a time that a client device of the new line waits is obviously shortened.

Further, after step 103 in the line initialization method described in Embodiment 1, the following is further included: calculating a physical layer parameter existing when a remaining resource unit in all the resource units except the at least one resource unit or the subset of the at least one resource unit is used on the new line, so that according to the physical layer parameter, data is transmitted on the new line by using the remaining resource unit in all the resource units except the at least one resource unit or the subset of the at least one resource unit.

The physical layer parameter includes a bit loaded on a subcarrier and a data framing parameter. Specifically, when the resource unit is a subcarrier, a signal-to-noise ratio (SNR) of the remaining subcarrier, used on the new line, in all the resource units except the at least one subcarrier or the subset of the at least one subcarrier is measured, and a bit that should be loaded on each subcarrier and a data framing parameter are calculated according to the signal-to-noise ratio (SNR) of each subcarrier, so that data is transmitted on the new line by using each subcarrier according to the bit that should be loaded on each subcarrier and the data framing parameter. When the resource unit is a timeslot, SNRs of all subcarriers or some subcarriers, on the new line, in the remaining timeslot except the at least one timeslot or the subset of the at least one timeslot are calculated, and a bit that should be loaded on each subcarrier and a data framing parameter are calculated according to the SNR of each subcarrier, so that data is transmitted on the new line, in the remaining timeslot, data by using each subcarrier according to the bit that should be loaded on each subcarrier and the data framing parameter.

It should be additionally noted herein that before or after the central office device performs crosstalk cancellation initialization on the new line, the new line transmits, always remaining a state, obtained after the basic initialization in Embodiment 1, data by using the at least one resource unit or the subset of the set of the at least one resource unit. According to the remaining resource unit in all the resource units except the at least one resource unit or the subset of the set of the at least one resource unit, the central office device determines the physical layer parameter for the new line by using the foregoing method, so that data is transmitted on the new line by using the remaining resource unit according to the physical layer parameter. Certainly, the new line may not transmits, remaining the state obtained after the basic initialization in Embodiment 1, data by using the at least one resource unit or the subset of the set of the at least one resource unit. After performing crosstalk cancellation initialization on the new line, the central office device recalculates physical layer parameters on all subcarriers or physical layer parameters on all or some subcarriers in all timeslots, so that data is transmitted on the new line by using each subcarrier according to a bit loaded on each subcarrier and a data framing parameter.

Further, when the resource unit is a timeslot, in addition to the foregoing manner, the central office device may also instruct to transmit data on the new line in another manner.

Specifically, if the resource unit is a timeslot, the central office device instructs to transmit data on the new line directly by using all the resource units, without calculating of the physical layer parameter described in the foregoing in this embodiment. The data is transmitted directly by using all the timeslots of all the resources.

Further, after step 103 in the line initialization method described in Embodiment 1, the following is further included: restoring the line at the Showtime stage to a transmission status existing before the new line is added; or acquiring, according to a preset correspondence between a resource unit set and a physical layer parameter, a physical layer parameter corresponding to the set of the at least one resource unit used on the line at the Showtime stage, so that on the line at the Showtime stage data is transmitted by using the at least one resource unit according to the physical layer parameter; or calculating a physical layer parameter existing when the at least one resource unit is used on the line at the Showtime stage, so that on the line at the Showtime stage data is transmitted by using the at least one resource unit according to the physical layer parameter.

Specifically, this embodiment is mainly about how to restore, after a new line is initialized to a line at a Showtime stage, an original line at the Showtime stage to an original status to transmit data. That is, a central office device may directly restore the line at the Showtime stage to a transmission status existing before the new line is added. Alternatively, because a resource unit set may be known in advance, physical layer parameter corresponding to all resource units or a set including at least one resource unit used by the line at the Showtime stage may be predetermined. Therefore, the central office device may prestore a correspondence between a resource unit set and a physical layer parameter, so that when the at least one resource unit needs to be reused by the line at the Showtime stage after the at least one resource unit is released, the central office device can directly query for the physical layer parameter corresponding to the set of the at least one resource unit. The central office device may not recalculate the physical layer parameter; therefore, switching of the line at the Showtime stage to a status existing before the resource unit is released and all the resource units are used to transmit data is accelerated. Alternatively, the central office device may also recalculate the physical layer parameter existing when the at least one resource unit is used on the line at the Showtime stage, so that on the line at the Showtime stage data is transmitted by using the at least one resource unit according to the physical layer parameter.

Figure 5:
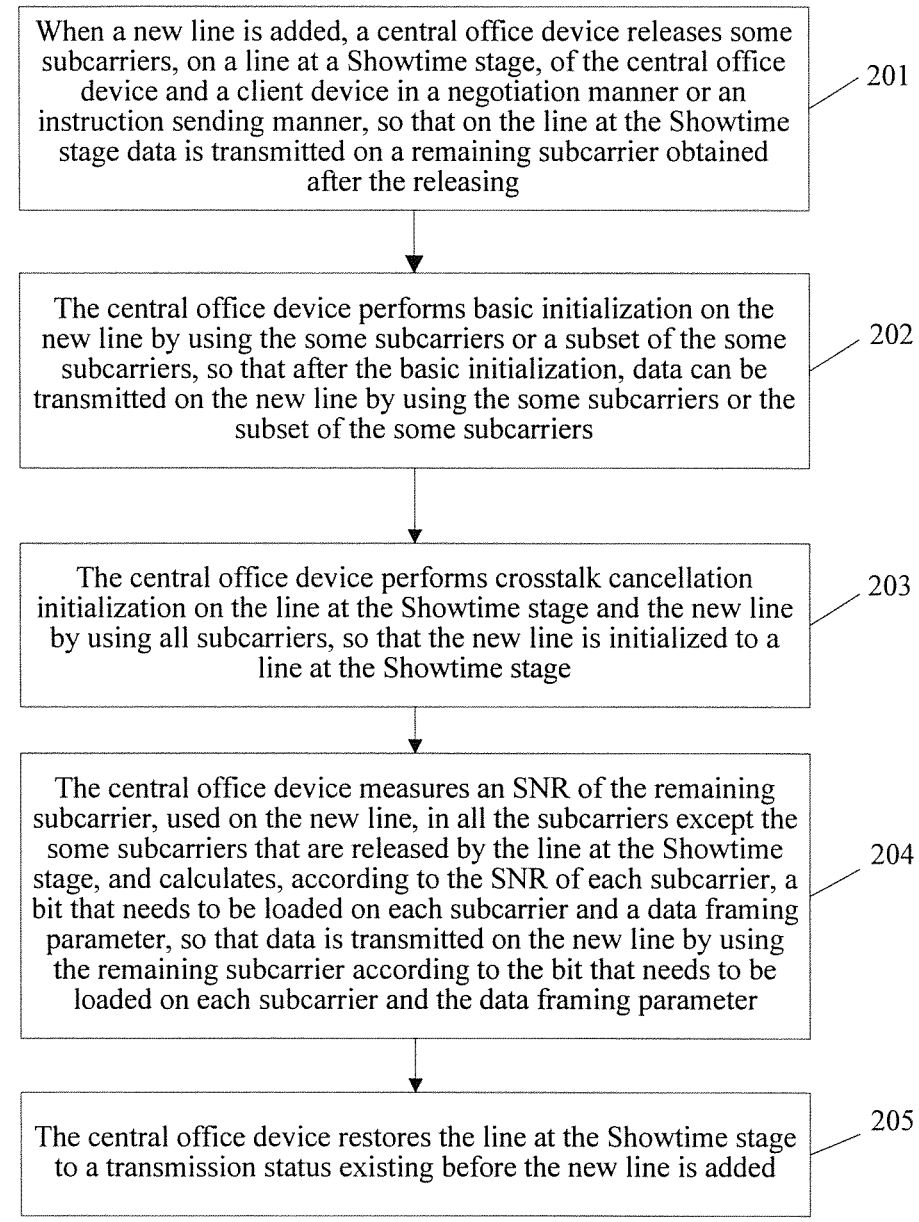
FIG. 5 is a schematic flowchart of a line initialization method according to Embodiment 2 of the present invention.

As shown in FIG. 5, FIG. 5 is a schematic flowchart of a line initialization method according to Embodiment 2 of the present invention. The method described in Embodiment 2 is based on an FDMA (Frequency Division Multiple Access, Frequency Division Multiple Access) technology, where first, some subcarriers on a line at a Showtime stage are released; then, basic initialization is performed on a new line by using the some subcarriers, so that data is transmitted on the new line by using a subcarrier different from that on the line at the Showtime stage, thereby avoiding crosstalk between the new line and the line at the Showtime stage; and subsequently, crosstalk cancellation initialization is performed on the line at the Showtime stage and the new line by using all subcarriers, to update an uplink crosstalk canceller and a downlink pre-coder of a system, so that data can be transmitted on the new line by using all the subcarriers, and crosstalk is cancelled, thereby completing an entire initialization process of the new line. Specifically, the following steps are included:

Step 201: When a new line is added, a central office device releases some subcarriers, on a line at a Showtime stage, of the central office device and a client device in a negotiation manner or an instruction sending manner, so that on the line at the Showtime stage data is transmitted on a remaining subcarrier obtained after the releasing.

Specifically, for how the central office device releases the some subcarriers, on the line at the Showtime stage, of the central office device and the client device in the negotiation manner or the instruction sending manner, reference may be made to related content in Embodiment 1, and details are not described herein again. The some subcarriers may be one or more subcarriers.

Step 202: The central office device performs basic initialization on the new line by using the some subcarriers or a subset of the some subcarriers, so that after the basic initialization, data can be transmitted on the new line by using the some subcarriers or the subset of the some subcarriers.

Specifically, the central office device may perform basic initialization on the new line by using all subcarriers that are released by the line at the Showtime stage, or may perform basic initialization on the new line by using some subcarriers in all subcarriers that are released by the line at the Showtime stage. When multiple new lines are added to the system, the central office device may perform basic initialization on all the new lines by using a same subcarrier set, or may perform basic initialization on all the new lines by using different subcarrier sets. The subcarrier set is a subset of all the subcarriers that are released by the line at the Showtime stage. When the central office device performs basic initialization on different lines by using different subsets, the subsets corresponding to the different lines may not intersect, or may have an intersection set.

The basic initialization is the same as the content described in Embodiment 1, and details are not described herein again.

Step 203: The central office device performs crosstalk cancellation initialization on the line at the Showtime stage and the new line by using all subcarriers, so that the new line is initialized to a line at the Showtime stage.

Specifically, the central office device performs crosstalk cancellation initialization on all lines (including the line at the Showtime stage and the new line) by using all the subcarriers on all the lines. After the foregoing basic initialization is complete, the new line has a data transmission capability. In this case, when further performing crosstalk cancellation initialization, the central office device may perform data exchange by using the new line, which can effectively improve a speed of the crosstalk cancellation initialization. That is, the central office device sends a pilot sequence or a sounding signal to the client device by using all the subcarriers that are on the line at the Showtime stage and the new line, so that the client device calculates and feeds back first error information according to a first test signal. The central office device corrects an adjustable parameter in a downlink pre-coder according to the first error information. The central office device receives a pilot sequence or a sounding signal that is sent by the client device by using all the subcarriers that are on the new line and the line at the Showtime stage. The central office device calculates second error information according to the pilot sequence or the sounding signal. The central office device corrects an adjustable parameter in an uplink crosstalk canceller according to the second error information.

Step 204: The central office device measures an SNR of the remaining subcarrier, used on the new line, in all the subcarriers except the some subcarriers that are released by the line at the Showtime stage, and calculates, according to the SNR of each subcarrier, a bit that needs to be loaded on each subcarrier and a data framing parameter, so that data is transmitted on the new line by using the remaining subcarrier according to the bit that needs to be loaded on each subcarrier and the data framing parameter.

After this step, the new line enters the Showtime stage.

Step 205: The central office device restores the line at the Showtime stage to a transmission status existing before the new line is added.

That is, the central office device acquires bits and data framing parameters on all the subcarriers that are used on the line at the Showtime stage before the some subcarriers are released, and then, instructs to transmit data on the line at the Showtime stage by using all the subcarriers according to the bits and the data framing parameters on all the subcarriers.

Alternatively, step 205 may further be that: the central office device recalculates or reacquires a bit and a data framing parameter on each released subcarrier that is used on the line at the Showtime stage, so that on the line at the Showtime stage data is transmitted by using the released subcarrier according to the bit and the data framing parameter on each subcarrier.

Specifically, the central office device measures an SNR of each subcarrier that is already released on the line at the Showtime stage, and then, calculates the bit and the data framing parameter on each subcarrier according to the SNR corresponding to each released subcarrier, so that on the line at the Showtime stage data is transmitted by using the released subcarrier according to the bit and the data framing parameter on each subcarrier. Alternatively, the central office device prestores a correspondence between a resource unit set and a physical layer parameter. The central office device may directly acquire a physical layer parameter corresponding to a set including a subcarrier that is released on the line at the Showtime stage, so that on the line at the Showtime stage data is transmitted by using the released subcarrier according to the physical layer parameter. The physical layer parameter includes the bit loaded on the subcarrier and the data framing parameter.

The line initialization process described in Embodiment 2 may be further described by using a principle diagram shown in FIG. 6. As shown in FIG. 6, initialization of a new line is divided into four parts in time by using three vertical dashed lines. In a first part, a line at a Showtime stage releases some subcarriers 1, and data is transmitted on the new line by using the some subcarriers 1 after undergoing basic initialization. In a second part, a central office device sends a pilot sequence or a sounding signal to a client device by using all subcarriers that are on all lines, so that the client device feeds back first error information according to the pilot sequence or the sounding signal, and the central office device corrects adjustable parameters in downlink pre-coders on all the subcarriers according to the first error information. The central office device receives a pilot sequence or a sounding signal that is sent on all the subcarriers by the client device, calculates second error information according to the pilot sequence or the sounding signal, and corrects adjustable parameters in uplink crosstalk cancellers on the subcarriers according to the second error information. In a third part, after the adjustable parameters in the uplink crosstalk cancellers and the downlink pre-coders of a system are corrected, all the lines transmit data on all the subcarriers. The central office device calculates a physical layer parameter corresponding to a remaining subcarrier except the some subcarriers released by the line at the Showtime stage for the new line, so that data is transmitted on the new line by using the remaining subcarrier according to the physical layer parameter. The line at the Showtime stage may be directly restored to a transmission status existing before the subcarriers is released, or the central office device recalculates or reacquires a physical layer parameter corresponding to each subcarrier released by the line at the Showtime stage, so that on the line at the Showtime stage data is transmitted by using the released subcarrier according to the physical layer parameter. In a fourth part, an initialization process of the new line is complete, and all the lines enter the Showtime stage.

Figure 7:
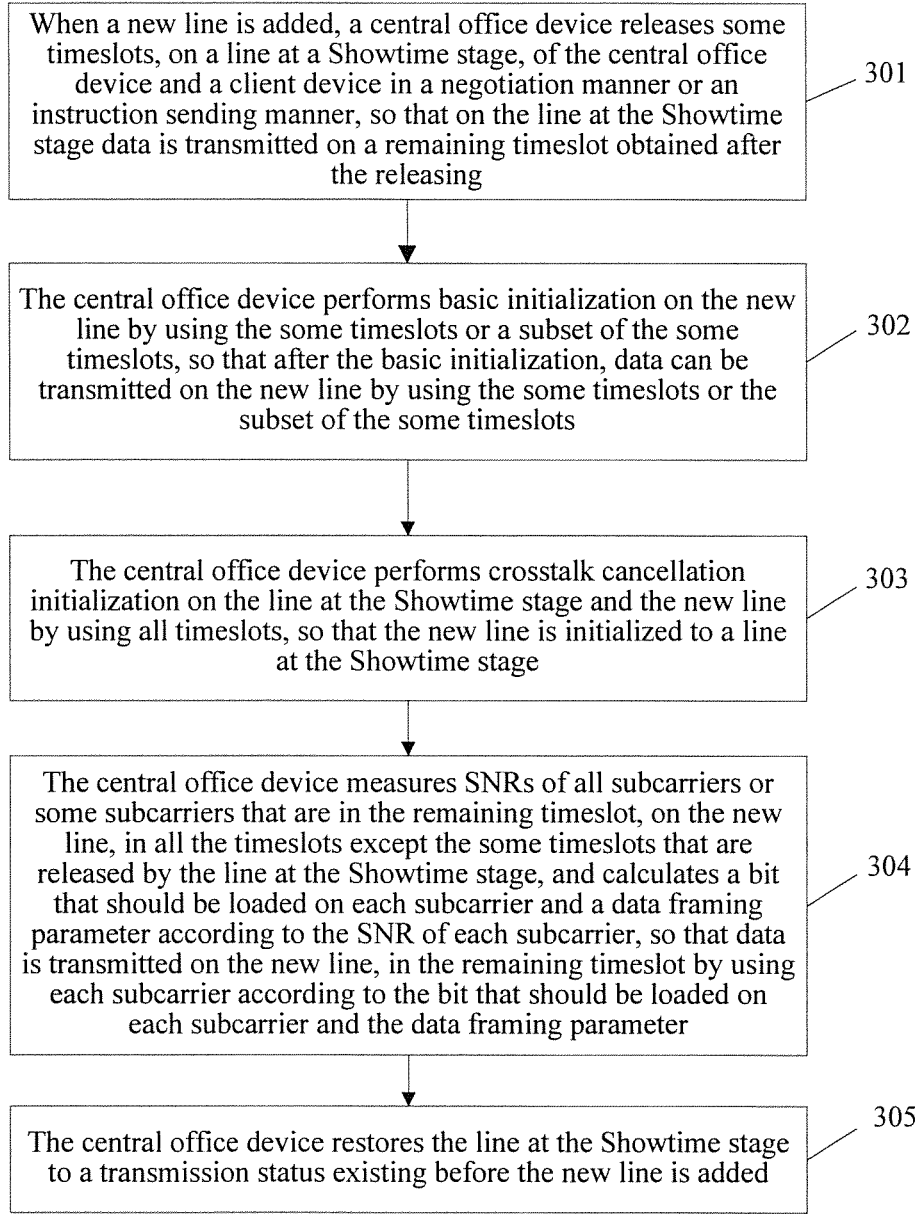
FIG. 7 is a schematic flowchart of a line initialization method according to Embodiment 3 of the present invention.

As shown in FIG. 7, FIG. 7 is a schematic flowchart of a line initialization method according to Embodiment 3 of the present invention. As shown in the figure, the method described in Embodiment 3 is based on TDMA (Time Division Multiple Access, Time Division Multiple Access), where first, some timeslots on a line at a Showtime stage are released or some timeslots that are used on none of lines at a Showtime stage are acquired; then, basic initialization is performed on a new line by using those timeslots, so that data is transmitted on the new line by using a timeslot different from that on the line at the Showtime stage, thereby avoiding crosstalk between the new line and the line at the Showtime stage; and subsequently, crosstalk cancellation initialization is performed on the line at the Showtime stage and the new line by using all timeslots, to update an uplink crosstalk canceller and a downlink pre-coder of a system, so that data can be transmitted on the new line by using all the timeslots, and crosstalk is cancelled, thereby completing an entire initialization process of the new line. Specifically, the following steps are included:

Step 301: When a new line is added, a central office device releases some timeslots, on a line at a Showtime stage, of the central office device and a client device in a negotiation manner or an instruction sending manner, so that on the line at the Showtime stage data is transmitted on a remaining timeslot obtained after the releasing.

Specifically, for how the central office device releases the timeslots, on the line at the Showtime stage, of the central office device and the client device in the negotiation manner or the instruction sending manner, reference may be made to related content in Embodiment 1, and details are not described herein again. The released timeslots may be one or more timeslots.

Step 302: The central office device performs basic initialization on the new line by using some of the timeslots or a subset of the timeslots, so that after the basic initialization, data can be transmitted on the new line by using some of the timeslots or the subset of the timeslots.

Specifically, the central office device may perform basic initialization on the new line by using all timeslots that are released by the line at the Showtime stage, or may perform basic initialization on the new line by using some timeslots in all timeslots that are released by the line at the Showtime stage. When multiple new lines are added to the system, the central office device may perform basic initialization on all the new lines by using a same timeslot set, or may perform basic initialization on all the new lines by using different timeslot sets. The timeslot set is a subset of all the timeslots that are released by the line at the Showtime stage. When the central office device performs basic initialization on different lines by using different subsets, the subsets corresponding to the different lines may not intersect, or may have an intersection set.

The basic initialization is the same as the content described in Embodiment 1, and details are not described herein again.

Step 303: The central office device performs crosstalk cancellation initialization on the line at the Showtime stage and the new line by using all timeslots, so that the new line is initialized to a line at the Showtime stage.

Specifically, after the foregoing basic initialization is complete, the new line has a data transmission capability In this case, when further performing crosstalk cancellation initialization, the central office device may perform data exchange by using the new line, which can effectively improve a speed of the crosstalk cancellation initialization. That is, the central office device sends, in all the timeslots that are on the new line and the line at the Showtime stage, a pilot sequence or a sounding signal to the client device by using all subcarriers or some subcarriers, so that the client device connected to the lines calculates and feeds back first error information according to the pilot sequence or the sounding signal, and the central office device recalculates a downlink vector pre-coder of the system according to the first error information, that is, corrects an adjustable parameter in the downlink vector pre-coder of the system. The central office device receives a pilot sequence or a sounding signal that is sent, in all the timeslots that are on the new line and the line at the Showtime stage, by the client device by using all the subcarriers or the some subcarriers; and the central office device calculates second error information according to the pilot sequence or the sounding signal, and calculates an uplink crosstalk canceller of the system according to the second error information, that is, corrects an adjustable parameter in the uplink crosstalk canceller of the system.

Step 304: The central office device measures SNRs of all subcarriers or some subcarriers that are in the remaining timeslot, on the new line, in all the timeslots except the some timeslots that are released by the line at the Showtime stage, and calculates a bit that should be loaded on each subcarrier and a data framing parameter according to the SNR of each subcarrier, so that data is transmitted on the new line, in the remaining timeslot by using each subcarrier according to the bit that should be loaded on each subcarrier and the data framing parameter.

Alternatively, this step 304 may further be that: the central office device directly instructs to transmit data on the new line by using all the timeslots.

Step 305: The central office device restores the line at the Showtime stage to a transmission status existing before the new line is added.

That is, the central office device acquires bits and data framing parameters on all the subcarriers or the some subcarriers in all the timeslots or the some timeslots that are used on the line at the Showtime stage before the some timeslots are released, and then, instructs the line at the Showtime stage to transmit, according to the bits and the data framing parameters on all the subcarriers, data by using all the timeslots that are used before the timeslots are released.

Alternatively, step 305 may further be that: the central office device recalculates or reacquires bits loaded on all the subcarriers or the some subcarriers and data framing parameters in the released timeslots that are used on the line at the Showtime stage, so that on the line at the Showtime stage data is transmitted by using the released timeslots according to the bit and the data framing parameter on each subcarrier.

Specifically, the central office device measures SNRs of all the subcarriers or the some subcarriers in the timeslots that are already released on the line at the Showtime stage, and then, calculates the bit and the data framing parameter on each subcarrier according to the SNR corresponding to each subcarrier, so that on the line at the Showtime stage data is transmitted by using the released timeslots according to the bit and the data framing parameter on each subcarrier. Alternatively, the central office device prestores a correspondence between a resource unit set and a physical layer parameter. The central office device may directly acquire a physical layer parameter corresponding to a set of all the timeslots that are already released by the line at the Showtime stage, so that on the line at the Showtime stage data is transmitted by using all the released timeslots according to the physical layer parameter. The physical layer parameter includes bits and data framing parameters on all subcarriers or some subcarriers in the timeslots.

The line initialization process described in Embodiment 3 may be further described by using a principle diagram shown in FIG. 8. As shown in FIG. 8, initialization of a new line is divided into four parts in time by using three vertical dashed lines. In a first part, a line at a Showtime stage releases some timeslots 2, and data is transmitted on the new line by using the timeslots 2 after undergoing basic initialization. In a second part, a central office device sends, by using all subcarriers or some subcarriers in timeslots corresponding to all synchronization symbols, a pilot sequence or a sounding signal to a client device by using all lines, so that the client device calculates and feeds back first error information according to the pilot sequence or the sounding signal; the central office device calculates downlink pre-coders that are on all the subcarriers or the some subcarriers in all the timeslots according to the first error information, that is, corrects adjustable parameters in downlink vector pre-coders of a system. The central office device receives a pilot sequence or a sounding signal that is sent by the client device on all the subcarriers or the some subcarriers in the timeslots corresponding to the synchronization symbols on all the lines, calculates a second error information according to the pilot sequence or the sounding signal, and calculates uplink crosstalk cancellers of the system according to the second error information, that is, corrects adjustable parameters in the uplink crosstalk cancellers of the system. In a third part, after the adjustable parameters in the uplink crosstalk cancellers and the downlink pre-coders of the system are corrected, all the lines transmit data on all or some subcarriers of Data Symbols in all the timeslots. The central office device calculates a physical layer parameter corresponding to all or some subcarriers that are in a remaining timeslot, on the new line, in all the timeslots except the some timeslots that are released by the line at the Showtime stage, so that data is transmitted on the new line by using all the subcarriers or the some subcarriers that are in the remaining timeslot according to the physical layer parameter; or the central office device directly instructs to transmit data on the new line in all the timeslots. The line at the Showtime stage may be directly restored to a transmission status existing before the timeslots are released; or the central office device recalculates or reacquires a physical layer parameter corresponding to all or some subcarriers that are in the timeslots released by the line at the Showtime stage, so that on the line at the Showtime stage data is transmitted by using all the subcarriers or the some subcarriers that are in the released timeslots according to the physical layer parameter. In a fourth part, an initialization process of the new line is complete, and all the lines enter the Showtime stage.

Figure 9:
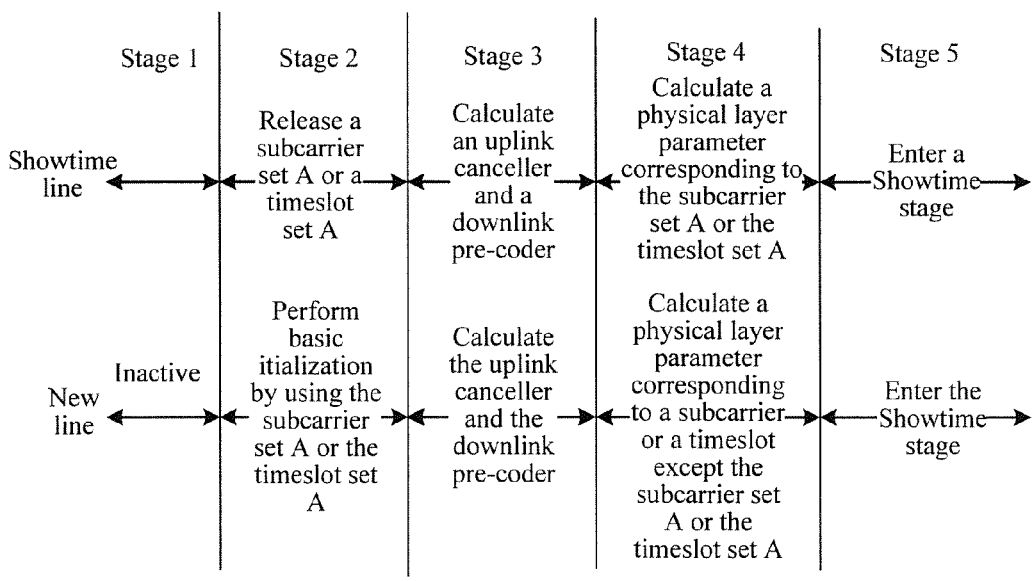
FIG. 9 is a principle diagram of data transmission statuses at stages of a line initialization method according to embodiments of the present invention.

As shown in FIG. 9, FIG. 9 is a principle diagram of data transmission status at stages of a line initialization method according to the embodiments of the present invention. According to FIG. 9, an initialization process of a new line is described from the perspective of data transmission status of all lines. At stage 1, when there is no new line, on a line at the Showtime stage data is transmitted by using all or some subcarriers or in all or some needed timeslots. At stage 2, after the line at the Showtime stage releases a subcarrier set A, or releases a timeslot set A, or releases an idle timeslot set A, on the line at the Showtime stage data is transmitted by using a remaining timeslot or subcarrier. A new line enters basic initialization. At stage 3, the new line and the line at the Showtime stage remain in current data transmission status, and a central office device calculates an uplink crosstalk canceller and a downlink pre-coder. At stage 4, on the line at the Showtime stage data is transmitted by using all subcarriers in the released subcarrier set A according to a bit and a data framing parameter, on each subcarrier, recalculated by the central office device. Data is transmitted on the line by using a remaining subcarrier according to a bit and a data framing parameter, calculated by the central office device, on the remaining subcarrier in all resource units except a subcarrier set A or a subset of the set A that is released by the line at the Showtime stage. At stage 5, both the new line and the line at the Showtime stage enter the Showtime stage.

Figure 10:
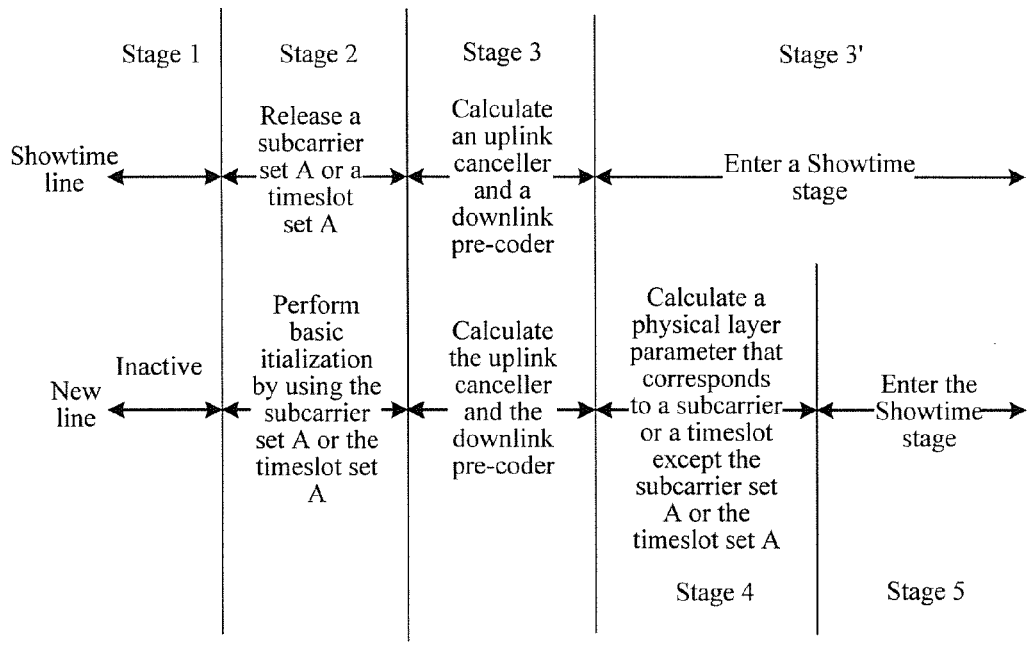
FIG. 10 is another principle diagram of data transmission status at stages of a line initialization method according to embodiments of the present invention.

As shown in FIG. 10, FIG. 10 is another principle diagram of data transmission status at stages of a line initialization method according to the embodiments of the present invention. According to this figure, an initialization process of a new line is also described from the perspective of data transmission status of all lines. A difference between FIG. 10 and FIG. 9 lies in that after the central office device calculates an uplink crosstalk canceller and a downlink pre-coder at stage 3, the line at the Showtime stage is directly switched to a data transmission status existing before subcarriers or timeslots are released, and directly enters stage 5.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Figure 11:
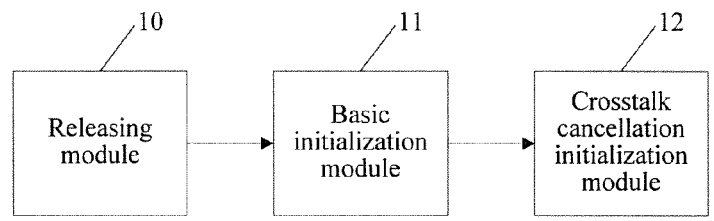
FIG. 11 is a schematic structural diagram of a central office device according to Embodiment 4 of the present invention.

As shown in FIG. 11, FIG. 11 is a schematic structural diagram of a central office device according to Embodiment 4 of the present invention. As shown in FIG. 11, the central office device includes: a releasing module 10, a basic initialization module 11, and a crosstalk cancellation initialization module 12. The releasing module 10 is configured to: when a new line is added, release at least one resource unit that is on a line at a Showtime stage, so that on the line at the Showtime stage data is transmitted on a remaining resource unit that is obtained after the at least one resource unit is released. The basic initialization module 11 is configured to perform basic initialization on the new line by using the at least one resource unit or a subset of the at least one resource unit, so that after the basic initialization, data can be transmitted on the new line by using the at least one resource unit or the subset of the set of the at least one resource unit. The crosstalk cancellation initialization module 12 is configured to perform crosstalk cancellation initialization on the line at the Showtime stage and the new line by using all resource units, so that the new line is initialized to a line at the Showtime stage, where all the resource units include the at least one resource unit and the remaining resource unit. The central office device described in this embodiment can implement the line initialization methods described in Embodiment 1, Embodiment 2, and Embodiment 3. For a specific implementation principle, reference may be made to the content described in the foregoing embodiments, and details are not described herein again.

In this embodiment, a central office device releases some resource units that are used on a line at a Showtime stage, and first performs basic initialization on a new line by using the some resource units, so that data can be transmitted on the new line by using the some resource units, and crosstalk between the new line and the line at the Showtime stage is temporarily avoided; and then, performs crosstalk cancellation initialization on the line at the Showtime stage and the new line by using all resource units. A large amount of data needs to be exchanged in a crosstalk cancellation initialization process. Because after the basic initialization, the new line already has a transmission capability, in this case, the new line can participate in data transmission in the crosstalk cancellation initialization process, thereby shortening a time for the crosstalk cancellation initialization. In terms of the entire initialization process, compared with the prior art, in this embodiment of the present invention, the new line can have a data transmission capability within a relatively short time, the line at the Showtime stage is not interfered by crosstalk in the entire initialization process, and the new line can be relatively rapidly used to transmit data; therefore, a time that a client device of the new line waits is obviously shortened.

The crosstalk cancellation initialization module in the foregoing embodiment may be implemented by using the following structure. Specifically, the crosstalk cancellation initialization module includes: a sending unit, a first calculation unit, a receiving unit, and a second calculation unit. The sending unit is configured to send a first test signal to a client device by using all the resource units that are on the new line and the line at the Showtime stage, so that the client device calculates and feeds back first error information according to the first test signal. The first calculation unit is configured to correct an adjustable parameter in a downlink pre-coder according to the first error information. The receiving unit is configured to receive a second test signal that is sent by the client device by using all the resource units that are on the new line and the line at the Showtime stage. The second calculation unit is configured to calculate second error information according to the second test signal, and correct an adjustable parameter in an uplink crosstalk canceller according to the second error information. The uplink crosstalk canceller and the downlink pre-coder are configured to cancel crosstalk interference between the new line and the line at the Showtime stage.

The releasing module in the foregoing embodiment may be implemented by using the following structure. Specifically, the releasing module includes: a sending unit and a releasing unit. The sending unit is configured to send, to the client device, negotiation information that carries the at least one resource unit to be released, so that the client device releases the at least one resource unit, on the line at the Showtime stage, of the client device according to the negotiation information, and returns corresponding acknowledgement information. The releasing unit is configured to release the at least one resource unit, on the line at the Showtime stage, of the central office device according to the acknowledgement information. Alternatively, the releasing unit is configured to release the at least one resource unit, on the line at the Showtime stage, of the central office device, and acquire, according to a preset correspondence between indication information and a resource unit set, indication information corresponding to the set of the at least one resource unit. The sending unit is configured to send the indication information to the client device, so that the client device acquires, according to the preset correspondence between indication information and a resource unit set, the resource unit set corresponding to the indication information, and releases the at least one resource unit, in the resource unit set and on the line at the Showtime stage, of the client device.

Figure 12:
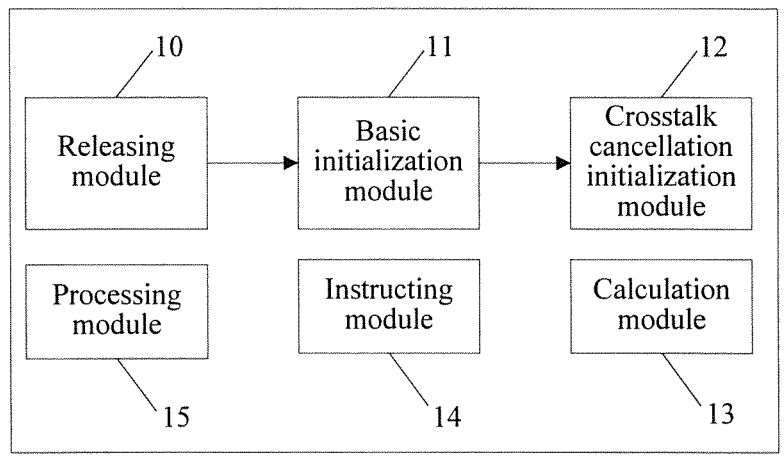
FIG. 12 is another schematic structural diagram of the central office device according to Embodiment 4 of the present invention.

Further, as shown in FIG. 12, the central office device described in Embodiment 4 further includes a calculation module 13. The calculation module 13 is configured to calculate a physical layer parameter existing when a remaining resource unit in all the resource units except the at least one resource unit or the subset of the at least one resource unit is used on the new line, so that data is transmitted on the new line by using the remaining resource unit according to the physical layer parameter.

Still further, as shown in FIG. 12, the central office device described in Embodiment 4 further includes an instructing module 14. The instructing module 14 is configured to: when the resource unit is a timeslot, instruct to transmit data on the new line directly by using all the resource units.

Yet further, as shown in FIG. 12, the central office device described in Embodiment 4 further includes a processing module 15. The processing module 15 is configured to restore the line at the Showtime stage to a transmission status existing before the new line is added; or acquire, according to a preset correspondence between a resource unit set and a physical layer parameter, a physical layer parameter corresponding to the set of the at least one resource unit used on the line at the Showtime stage, so that on the line at the Showtime stage data is transmitted by using the at least one resource unit according to the physical layer parameter; or calculate a physical layer parameter existing when the at least one resource unit is used on the line at the Showtime stage, so that on the line at the Showtime stage data is transmitted by using the at least one resource unit according to the physical layer parameter.

Figure 13:
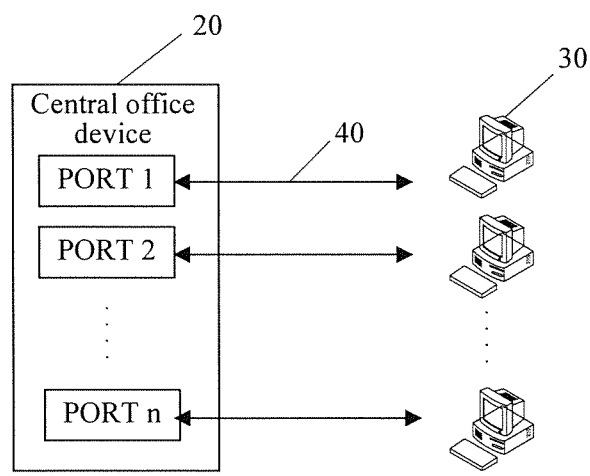
FIG. 13 is a schematic structural diagram of a communications system according to Embodiment 5 of the present invention.

As shown in FIG. 13, FIG. 13 is a schematic structural diagram of a communications system according to Embodiment 5 of the present invention. As shown in the figure, the communications system in this embodiment includes a central office device 20 and at least one client device 30. The central office device 20 is connected to at least client device 30 by using a line 40. The central office device 20 is configured to: when a new line is added, release at least one resource unit that is on a line at a Showtime stage, so that on the line at the Showtime stage data is transmitted on a remaining resource unit that is obtained after the at least one resource unit is released; perform basic initialization on the new line by using the at least one resource unit or a subset of the at least one resource unit, so that after the basic initialization, data can be transmitted on the new line by using the at least one resource unit or the subset of the set of the at least one resource unit; and perform crosstalk cancellation initialization on the line at the Showtime stage and the new line by using all resource units, so that the new line is initialized to a line at the Showtime stage. All the resource units include the at least one resource unit and the remaining resource unit.

Specifically, the central office device may specifically be the central office device described in Embodiment 4.

It should be noted herein that: the central office device described in the embodiments of the present invention may be a DSLAM, a device that is disposed in a central office device and that has a VCE (Vectoring Control Entity, vectoring control entity), or the like.

Figure 14:
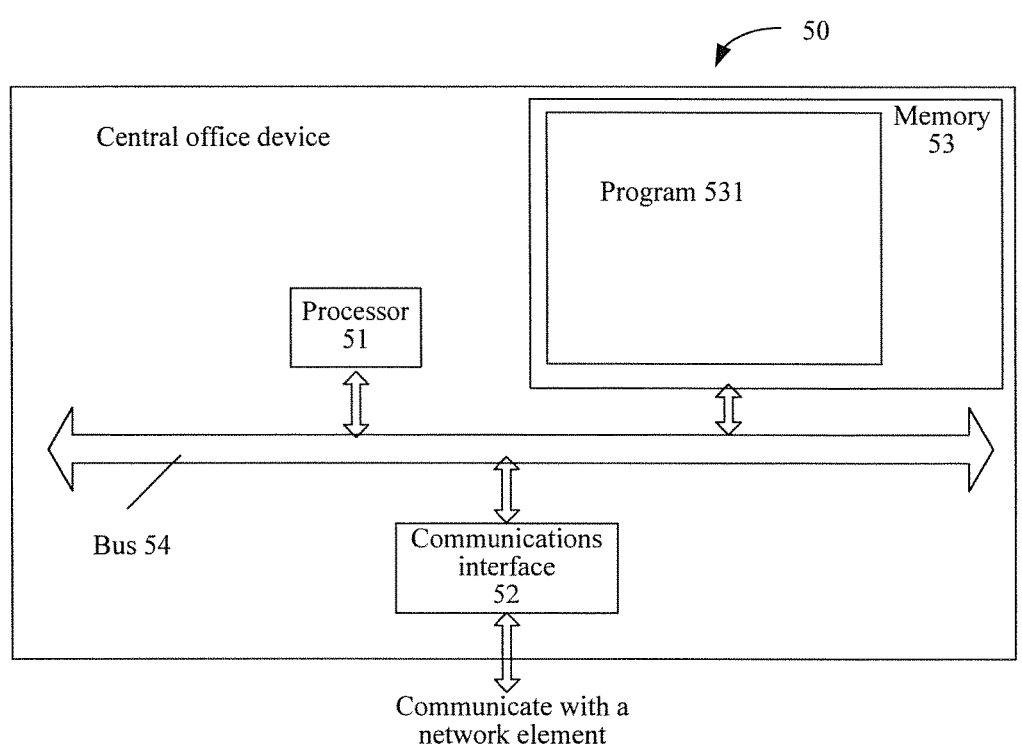
FIG. 14 is still another schematic structural diagram of a central office device according to an embodiment of the present invention.

As shown in FIG. 14, FIG. 14 is a schematic diagram of a central office device 50 according to the present invention. As shown in FIG. 14, the central office device 50 includes: a processor 51, a communications interface 52, a memory 53, and a bus 54.

The processor 51, the communications interface 52, and the memory 53 communicate with one another by using the bus 54.

The communications interface 52 is configured to communicate with a network element, for example, a client device.

The processor 51 is configured to execute a program 531.

Specifically, the program 531 may include program code, where the program code includes a computer operating instruction.

The processor 51 may be a central processing unit (CPU), or an application-specific integrated circuit (ASIC), or one or more integrated circuits configured to implement this embodiment of the present application.

The memory 53 is configured to store the program 531. The memory 53 may include a high-speed RAM memory, or may further include a non-volatile memory (non-volatile memory), for example, at least one magnetic disk memory.

The program 531 may specifically include a piece of program code, where the piece of program code is used to: when a new line is added, release at least one resource unit that is on a line at a Showtime stage, so that on the line at the Showtime stage data is transmitted on a remaining resource unit that is obtained after the at least one resource unit is released; perform basic initialization on the new line by using the at least one resource unit or a subset of the at least one resource unit, so that after the basic initialization, data can be transmitted on the new line by using the at least one resource unit or the subset of the set of the at least one resource unit; and perform crosstalk cancellation initialization on the line at the Showtime stage and the new line by using all resource units, so that the new line is initialized to a line at the Showtime stage, where all the resource units include the at least one resource unit and the remaining resource unit.

It may be clearly understood by persons skilled in the art that, for the purpose of convenient and brief description, for a detailed working process of the foregoing described system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A line initialization method, comprising:
when a new line is added, releasing at least one resource unit on a line at a Showtime stage, wherein on the line at the Showtime stage data is transmitted on a remaining resource unit that is obtained after the at least one resource unit is released;
performing basic initialization on the new line by using the at least one resource unit or a subset of the at least one resource unit, to transmit data on the new line after the basic initialization by using the at least one resource unit or the subset of the at least one resource unit; and
performing crosstalk cancellation initialization on the line at the Showtime stage and the new line by using resource units comprising the at least one resource unit and the remaining resource unit, to enable the new line to be initialized to a line at the Showtime stage.

2. The line initialization method according to claim 1, wherein the resource unit is a subcarrier or a timeslot.

3. The line initialization method according to claim 1, wherein performing crosstalk cancellation initialization on the line at the Showtime stage and the new line by using the resource units comprises:
sending a first test signal to a client device by using resource units that are on the new line and the line at the Showtime stage to enable the client device to calculate and feed back first error information according to the first test signal;
correcting an adjustable parameter in a downlink pre-coder according to the first error information;
receiving a second test signal that is sent by the client device by using the resource units that are on the new line and the line at the Showtime stage;
calculating second error information according to the second test signal; and
correcting an adjustable parameter n an uplink crosstalk canceller according to the second error information, wherein the uplink crosstalk canceller and the downlink pre-coder are configured to cancel crosstalk interference between the new line and the line at the Showtime stage.

4. The line initialization method according to claim 3, wherein the test signal is a pilot sequence or a sounding signal.

5. The line initialization method according to claim 1, wherein after performing crosstalk cancellation initialization on the line at the Showtime stage and the new line by using the resource units, the method further comprises:
calculating a physical layer parameter existing when a remaining resource unit in the resource units except the at least one resource unit or the subset of the at least one resource unit is used on the new line to enable data to be transmitted on the new line by using the remaining resource unit according to the physical layer parameter.

6. The line initialization method according to claim 5, wherein the physical layer parameter comprises a bit loaded on a subcarrier and a data framing parameter.

7. The line initialization method according to claim 1, wherein after performing crosstalk cancellation initialization on the line at the Showtime stage and the new line by using the resource units, the method further comprises:
when the resource unit is a timeslot, instructing to transmit data on the new line directly by using the resource units.

8. The line initialization method according to claim 1, wherein after performing crosstalk cancellation initialization on the line at the Showtime stage and the new line by using the resource units, the method further comprises:
restoring the line at the Showtime stage to a transmission status existing before the new line is added; or
acquiring, according to a preset correspondence between a resource unit set and a physical layer parameter, a physical layer parameter corresponding to a set of the at least one resource unit used on the line at the Showtime stage, to enable on the line at the Showtime stage data to be transmitted by using the at least one resource unit according to the physical layer parameter; or
calculating a physical layer parameter existing when the at least one resource unit is used on the line at the Showtime stage, to enable on the line at the Showtime stage data to be transmitted by using the at least one resource unit according to the physical layer parameter.

9. The line initialization method according to claim 1, wherein releasing at least one resource unit that is on a line at a Showtime stage comprises:
sending, to the client device, negotiation information that carries the at least one resource unit to be released, to enable the client device to release the at least one resource unit, on the line at the Showtime stage, of the client device according to the negotiation information, and returns corresponding acknowledgement information, and releasing the at least one resource unit, on the line at the Showtime stage, of a central office device according to the acknowledgement information; or
releasing the at least one resource unit, on the line at the Showtime stage, of a central office device, and acquiring, according to a preset correspondence between indication information and a resource unit set, indication information corresponding to the set of the at least one resource unit, and sending the indication information to the client device, to enable the client device to acquire, according to the preset correspondence between indication information and a resource unit set, the resource unit set corresponding to the indication information, and release the at least one resource unit, in the resource unit set and on the line at the Showtime stage, of the client device.

10. A central office device, comprising:
a processor; and
memory coupled to the processor, the memory comprising instructions that, when executed by the processor, cause the central office device to:
when a new line is added, release at least one resource unit that is on a line at a Showtime stage, wherein on the line at the Showtime stage data is transmitted on a remaining resource unit that is obtained after the at least one resource unit is released;
perform basic initialization on the new line by using the at least one resource unit or a subset of the at least one resource unit, to transmit data on the new line after the basic initialization by using the at least one resource unit or the subset of the set the at least one resource unit; and
performing crosstalk cancellation initialization on the line at the Showtime stage and the new line by using resource units comprising the at least one resource unit and the remaining resource unit, to enable the new line to be initialized to a line at the Showtime stage.

11. The central office device according to claim 10, wherein the instructions, when executed by the processor, cause the central office device to:
send a first test signal to a client device by using resource units that are on the new line and the line at the Showtime stage, to enable the client device to calculate and feed back first error information according to the first test signal;
correct an adjustable parameter in a downlink pre-coder according to the first error information;
receive a second test signal that is sent by the client device by using the resource units that are on the new line and the line at the Showtime stage; and
calculate second error information according to the second test signal, and correct an adjustable parameter in an uplink crosstalk canceller according to the second error information, wherein the uplink crosstalk canceller is configured to cancel crosstalk interference between the new line and the line at the Showtime stage.

12. The central office device according to claim 10, wherein the instructions, when executed by the processor, cause the central office device to:
calculate a physical layer parameter existing when a remaining resource unit in the resource units except the at least one resource unit or the subset of the at least one resource unit is used on the new line, to enable data to be transmitted on the new line by using the remaining resource unit according to the physical layer parameter.

13. The central office device according to claim 10, wherein the instructions, when executed by the processor, cause the central office device to:
when the resource unit is a timeslot, transmit data on the new line directly by using the resource units.

14. The central office device according to claim 10, wherein the instructions, when executed by the processor, cause the central office device to:
restore the line at the Showtime stage to a transmission status existing before the new line is added; or
acquire, according to a preset correspondence between a resource unit set and a physical layer parameter, a physical layer parameter corresponding to the set of the at least one resource unit used on the line at the Showtime stage, to enable on the line at the Showtime stage data to be transmitted by using the at least one resource unit according to the physical layer parameter; or calculate a physical layer parameter existing when the at least one resource unit is used on the line at the Showtime stage, to enable on the line at the Showtime stage data to be transmitted by using the at least one resource unit according to the physical layer parameter.

15. The central office device according to claim 10, wherein the instructions, when executed by the processor, cause the central office device to:

send, to the client device, negotiation information that carries the at least one resource unit to be released, to enable the client device to release the at least one resource unit, on the line at the Showtime stage, of the client device according to the negotiation information, and return corresponding acknowledgement information, and release the at least one resource unit, on the line at the Showtime stage, of a central office device according to the acknowledgement information; or release the at least one resource unit, on the line at the Showtime stage, of a central office device, and acquire, according to a preset correspondence between indication information and a resource unit set, indication information corresponding to the set of the at least one resource unit, and send the indication information to the client device, to enable the client device to acquire, according to the preset correspondence between indication information and a resource unit set, the resource unit set corresponding to the indication information, and release the at least one resource unit, in the resource unit set and on the line at the Showtime stage, of the client device.

16. A central office device, comprising:

a processor, a communications interface, a memory and a bus, wherein the processor, the communications interface and the memory are configured to communicate with one another by using the bus;

wherein the communications interface is configured to connect to a client device by using a new line and a line at a Showtime stage;

wherein the memory is configured to store a program; and wherein the processor is configured to execute the program to:

when a new line is added, release at least one resource unit that is on a line at a Showtime stage, wherein on the line at the Showtime stage data is transmitted on a remaining resource unit that is obtained after the at least one resource unit is released, perform basic initialization on the new line by using the at least one resource unit or a subset of the at least one resource unit, to transmit data on the new line after the basic initialization by using the at least one resource unit or the subset of the at least one resource unit, and perform crosstalk cancellation initialization on the line at the Showtime stage and the new line by using resource units comprising the at least one resource unit and the remaining resource unit, to enable the new line to be initialized to a line at the Showtime stage.

* * * * *